(12) United States Patent
Hong et al.

(10) Patent No.: US 11,407,936 B2
(45) Date of Patent: Aug. 9, 2022

(54) COMPOSITION FOR FORMING A QUANTUM DOT LAYER, QUANTUM DOT FILM, BACKLIGHT UNIT, AND LIQUID CRYSTAL DISPLAY

(71) Applicants: SHIN-A T&C, Seoul (KR); UNIAM, Seoul (KR)

(72) Inventors: Seung Mo Hong, Incheon (KR); Jin Han Song, Seoul (KR); Won Jong Song, Paju-si (KR); In Won Lee, Seoul (KR)

(73) Assignees: Shin-A T&C, Seoul (KR); UNIAM, Seoul (KR)

( * ) Notice: Subject to any disclaimer, the term of this patent is extended or adjusted under 35 U.S.C. 154(b) by 249 days.

(21) Appl. No.: 16/683,422

(22) Filed: Nov. 14, 2019

(65) Prior Publication Data

US 2020/0157420 A1  May 21, 2020

(30) Foreign Application Priority Data

Nov. 15, 2018 (KR) .................. 10-2018-0140464

(51) Int. Cl.

| | | |
|---|---|---|
| *C09K 11/02* | (2006.01) | |
| *C08F 220/18* | (2006.01) | |
| *C08F 222/10* | (2006.01) | |
| *C08F 222/14* | (2006.01) | |
| *C08F 222/20* | (2006.01) | |
| *C08K 3/32* | (2006.01) | |
| *C08K 9/02* | (2006.01) | |
| *C09K 11/08* | (2006.01) | |
| *C09K 11/70* | (2006.01) | |
| *B82Y 20/00* | (2011.01) | |
| *B82Y 40/00* | (2011.01) | |

(52) U.S. Cl.
CPC .......... *C09K 11/02* (2013.01); *C08F 220/18* (2013.01); *C08F 222/1006* (2013.01); *C08F 222/14* (2013.01); *C08F 222/20* (2013.01); *C08K 3/32* (2013.01); *C08K 9/02* (2013.01); *C09K 11/0883* (2013.01); *C09K 11/703* (2013.01); *B32B 2457/20* (2013.01); *B32B 2457/202* (2013.01); *B82Y 20/00* (2013.01); *B82Y 40/00* (2013.01); *C08F 222/102* (2020.02); *C08F 2800/20* (2013.01); *C08K 2201/011* (2013.01); *C09K 2323/00* (2020.08); *C09K 2323/03* (2020.08); *C09K 2323/035* (2020.08)

(58) Field of Classification Search
CPC .......... B32B 2457/20; B32B 2457/202; B82Y 20/00; B82Y 30/00; B82Y 40/00; C08F 2/48; C08F 20/18; C08F 220/18; C08F 222/10; C08F 222/1006; C08F 222/102; C08F 222/14; C08F 222/20; C08F 2800/20; C08F 220/1811; C08J 5/18; C08K 3/10; C08K 3/22; C08K 3/32; C08K 5/37; C08K 7/02; C08K 9/02; C08K 2003/2296; C08K 2201/011; C09D 4/00; C09K 11/02; C09K 11/0883; C09K 11/703; C09K 2323/00; C09K 2323/03; C09K 2323/035; G02B 6/004; G02F 1/1336; G02F 1/133614

See application file for complete search history.

(56) References Cited

U.S. PATENT DOCUMENTS

| | | | |
|---|---|---|---|
| 10,267,488 B2 | 4/2019 | Sung et al. | |
| 2015/0098212 A1 | 4/2015 | Won et al. | |
| 2016/0161066 A1 | 6/2016 | Sung et al. | |
| 2016/0340553 A1 | 11/2016 | Eckert et al. | |
| 2017/0277002 A1* | 9/2017 | Yamada | C09K 11/02 |
| 2017/0328541 A1 | 11/2017 | Yoneyama et al. | |
| 2018/0044586 A1 | 2/2018 | Kwon et al. | |
| 2018/0282617 A1 | 10/2018 | Qiu et al. | |
| 2019/0041747 A1 | 2/2019 | Youn et al. | |
| 2020/0017762 A1 | 1/2020 | Mansei et al. | |
| 2020/0255598 A1* | 8/2020 | Mukaigaito | C08L 101/00 |

FOREIGN PATENT DOCUMENTS

| | | | |
|---|---|---|---|
| CN | 104513335 A | 4/2015 | |
| CN | 105829103 A | 8/2016 | |
| CN | 106188398 A | 12/2016 | |
| CN | 107109209 A | 8/2017 | |
| CN | 108431647 A | 8/2018 | |
| CN | 111149022 A | 5/2020 | |
| JP | 2012-188659 A | 10/2012 | |
| JP | 6159351 B2 | 7/2017 | |
| JP | 6404372 B2 | 10/2018 | |
| KR | 10-2013-0107461 A | 10/2013 | |
| KR | 10-1686713 B1 | 12/2016 | |
| KR | 10-2018-0019003 A | 2/2018 | |
| WO | 2016/081219 A1 | 5/2016 | |
| WO | 2017/217631 A1 | 12/2017 | |
| WO | WO-2019066064 A1 * | 4/2019 | C08L 101/00 |

* cited by examiner

*Primary Examiner* — Eli D. Strah
(74) *Attorney, Agent, or Firm* — Sughrue Mion, PLLC

(57) ABSTRACT

The present invention relates to a composition for forming a quantum dot layer comprising: at least one active energy ray-curable compound (A) having an ethylenically unsaturated double bond, at least one thiol compound (B) having at least two mercapto groups in one molecule, a photoinitiator (C); quantum particles (D), and scattering particles (E), wherein the composition contains 0.20-0.80 equivalents of the compound (B) per one equivalent of the compound (A), and the W value of the compound (A) calculated by Math formula 1 is 3.0 or more, and the present invention also relates to a quantum dot film, a backlight unit, and a liquid crystal display.

14 Claims, No Drawings

COMPOSITION FOR FORMING A QUANTUM DOT LAYER, QUANTUM DOT FILM, BACKLIGHT UNIT, AND LIQUID CRYSTAL DISPLAY

CROSS-REFERENCE TO RELATED APPLICATION

This application claims under 35 U.S.C. § 119(a) the benefit of Korean Patent Application No. 10-2018-0140464 filed on Nov. 15, 2018, the entire contents of which are incorporated herein by reference.

BACKGROUND

(a) Technical Field

The present invention relates to a composition for forming a quantum dot layer, a quantum dot film, a backlight unit, and a liquid crystal display.

(b) Background Art

Recently, the display field has been rapidly developed in line with the information age. In response to this, as a Flat Panel Display (FPD) having advantages of slim profile, light weight, and low power consumption, a Liquid Crystal Display (LCD), a Plasma Display Panel device (PDP), an Electroluminescence Display (ELD), a Field Emission Display (FED), and the like have been developed to rapidly replace an existing Cathode Ray Tube (CRT) and is in the spotlight.

Since the liquid crystal display is a light-receiving type display device that does not form an image by emitting light by itself and forms an image by light incident from the outside, the liquid crystal display essentially requires a light source for providing light. In the past, a Cold Cathode Fluorescent Lamp (CCFL) has be mainly used as the light source of the liquid crystal display. However, in the case of the CCFL, as the size of the liquid crystal display increases, it is difficult to secure brightness uniformity and color purity is deteriorated.

Therefore, in recent years, three-color Light Emitting Diode (LED) has tended to be used instead of the Cold Cathode fluorescent lamp as the light source of the liquid crystal display. When the three-color LED is used as the light source, there is an advantage that high color purity can be realized to thereby implement high-quality images, but there is a disadvantage that since the three-color LED is expensive, the manufacturing cost thereof increases. Therefore, there have been proposed technologies that use a relatively inexpensive blue light emitting diode and implement white light by converting blue light into red light and green light by using a light conversion film including quantum dots (QDs).

The quantum dot (QD) has a property that is oxidized by oxygen or moisture. Therefore, an oxygen and moisture barrier of the light conversion film containing the quantum dots is very important. Therefore, the light conversion film is manufactured by attaching a barrier film to an upper surface and a lower surface. However, since the side portion of the film does not include a separate barrier means, oxygen or moisture penetrates through the side portion. Accordingly, efforts have been made to form a quantum dot layer using a matrix resin with low permeability to oxygen and moisture.

European Patent Publication EP3221421A describes a quantum dot film which uses a polymer matrix having a Tg of 20° C. or more using thiol-alkene resin. However, there is a limit that it is difficult to supplement the vulnerability of the quantum dot particles to oxygen or moisture only with the polymer matrix having Tg of 20° C. or higher.

Japanese Patent JP6159351 discloses a composition comprising quantum dot particles and boronic acid without thiol groups and comprising the first polymerizable compound composed of 2 or more functionalities of methacrylate monomer and a monomer comprising 2 or more functionalities of epoxy and oxetyl group, and the second polymerizable compound having a functional group with hydrogen bonding property and at the same time, having a polymerizable group capable of polymerizing with the first polymerizable compound. However, the epoxy and oxetyl structures of the first polymerizable compound inevitably generate hydroxyl groups after curing, and the hydroxyl group, the carboxyl group, and the urethane group of the second polymerizable compound, which are functional groups having hydrogen bonding properties, are hydrophilic. Thus, these hydrophilic groups degrade the performance of the quantum dot particles susceptible to moisture.

Korean Patent No. 1686713 manufactures a quantum dot film using a matrix resin including a repeating unit derived from an epoxy (meth) acrylate without a thiol group. The epoxy(meth)acrylate is prepared by the reaction of an epoxy resin and (meth)acrylic acid, and generates hydroxyl groups during the process. The epoxy(meth)acrylate resin containing a hydrophilic hydroxyl group has a very high viscosity, and thus makes the lamination process difficult and vulnerable to oxygen and moisture, thereby degrading the performance of quantum dot particles.

PRIOR ART DOCUMENT

Patent Document

European Patent Publication EP3221421A.

SUMMARY OF THE DISCLOSURE

In order to solve the above problems of the prior art, an object of the present invention is to provide a composition for forming a quantum dot layer that can effectively prevent oxidation of quantum dots by inhibiting the penetration of oxygen and moisture.

In addition, it is another object of the present invention to provide a composition for forming a quantum dot layer exhibiting excellent luminance in a high temperature and high humidity environment, and having excellent durability by prevention of edge discoloration, etc.

In addition, it is still another object of the present invention to provide a quantum dot film having a quantum dot layer formed of the composition for forming a quantum dot layer, a backlight unit and a liquid crystal display.

In order to achieve the above objects, the present invention provides a composition for forming a quantum dot layer comprising: at least one active energy ray-curable compound (A) having an ethylenically unsaturated double bond, at least one thiol compound (B) having at least two mercapto groups in one molecule, a photo-initiator (C), quantum dot particles (D), and scattering particles (E), wherein the composition contains 0.20-0.80 equivalents of the compound (B) per one equivalent of the compound (A), and the W value of the compound (A) calculated by Math formula 1 is 3.0 or more:

$$W = \Sum_1^n (\log P_n \times WF_n) \qquad \text{[Math formula 1]}$$

wherein, log $P_n$: water/octanol partition coefficient of n substance, and $WF_n$: weight fraction of n substance, $\Sigma_1^n WF_n=1$.

In addition, the present invention provides a quantum dot film comprising: a first barrier layer; a second barrier layer; and quantum dot layer positioned between the first barrier layer and the second barrier layer, wherein the quantum dot layer is formed of the composition for forming the quantum dot layer of the present invention.

In addition, the present invention provides a backlight unit comprising the quantum dot film and a liquid crystal display comprising the backlight unit.

The composition for forming the quantum dot layer of the present invention and the quantum dot film including the quantum dot layer formed by using the same have an excellent protection performance against the penetration of oxygen and moisture, providing an effect that effectively prevents the quantum dot oxidation.

In addition, due to the above effects, excellent luminance is exhibited even in a high temperature and high humidity environment, and excellent durability is provided by edge discoloration prevention.

In addition, the backlight unit and the liquid crystal display of the present invention comprising the quantum dot film provide excellent luminance and durability.

DETAILED DESCRIPTION

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The present invention relates to a composition for forming a quantum dot layer comprising: at least one active energy ray-curable compound (A) having an ethylenically unsaturated double bond, at least one thiol compound (B) having at least two mercapto groups in one molecule, a photoinitiator (C), quantum dot particles (D), and scattering particles (E), wherein the composition contains 0.20-0.80 equivalents of the compound (B) per one equivalent of the compound (A), and the W value of the compound (A) calculated by Math formula 1 is 3.0 or more:

$$W=\Sigma_1^n(\log P_n \times WF_n) \quad \text{[Math formula 1]}$$

wherein, log $P_n$: water/octanol partition coefficient of n substance, and $WF_n$: weight fraction of n substance, $\Sigma_1^n WF_n=1$.

In the composition for forming a quantum dot layer, at least one thiol compound (B) having at least two mercapto groups in one molecule may be comprised in the amount of equivalent of 0.20 to 0.80, more preferably 0.3 to 0.7 relative to one equivalent of at least one active energy ray-curable compound (A) having an ethylenically unsaturated double bond.

If the equivalent weight of the at least one thiol compound (B) having at least two mercapto groups in one molecule is less than 0.20, Since the interpenetrating polymer network (IPN) structure is not smoothly implemented, the curing shrinkage is large and the bonding with the barrier layer is reduced, so that the adhesion force is reduced. If the equivalent weight is greater than 0.80, since chain transfer reaction is superior to UV curing reaction, sufficient curing density cannot be obtained, so it is difficult to secure reliability of quantum dot film in high temperature and high humidity environment.

The equivalent weights of the at least one active energy ray-curable compound (A) having an ethylenically unsaturated double bond and the at least one thiol compound (B) having at least two mercapto groups in one molecule can be defined as the number of g including the functional group of 1 g equivalent, and the equivalent weight of n mixtures can be calculated by the following Math formula 2.

$$\text{Equivalent weight}(g/eq.)=\Sigma_1^n[WF_n \times (Wn/Fn)] \quad \text{[Math formula 2]}$$

wherein, $WF_n$: weight fraction of n substance, $\Sigma_1^n WF_n=1$,

Wn: theoretical molecular weight of n substance, and

Fn: theoretical number of functional groups of n substance.

In addition, in the composition for forming a quantum dot layer of the present invention, the W value of the compound (A) calculated by the Math formula 1 is 3.0 or more.

The inventors of the present invention have confirmed that the water/octanol partition coefficient of the at least one active energy ray-curable compound (A) having an ethylenically unsaturated double bond is an important factor in protecting quantum dot particles that are susceptible to oxygen and moisture within the polymer matrix of the quantum dot layer.

The water/octanol partition coefficient is expressed as log P, and represents a concentration ratio of the solute between water and octanol that are not mixed with each other, which is a coefficient widely used to determine the hydrophilicity and hydrophobicity of the solute. Log P is expressed as the value obtained by dividing the concentration of solute in octanol by the concentration in water. In this case, the unit of concentration is mol/L. A substance having a log P value greater than 1 is considered to be a hydrophobic substance, and a substance having a log P value of less than 1 is considered to be a hydrophilic substance.

The W value in Math Formula 1, calculated by using the water/octanol partition coefficient log P of the at least one active energy ray-curable compound (A) having an ethylenically unsaturated double bond contained in the composition for forming a quantum dot layer of the present invention, defines the water/octanol partition coefficient of a mixture of n monocomponent or multicomponent compounds.

In the composition for forming the quantum dot layer of the present invention, the W value may be 3.0 or more, more preferably 3.4 or more. If the W value satisfies the above range, it is preferable to ensure the reliability of the quantum dot film, and particularly, the reliability of the quantum dot film can be secured in an environment such as high temperature and high humidity. The upper limit value in the W value is not particularly limited, but may be 6 or less.

The water/octanol partition coefficient log P of each compound may have errors depending on the experimental method, so the results may vary slightly from literature to literature. In the present invention, water/octanol partition coefficient log P is a theoretically calculated value, and shows the value obtained by rounding off the theoretically calculated value ClogP, among the values of the chemical properties obtained through the theoretical molecular structure of the compounds (excluding impurities) using PerkinElmer's Chemdraw Professional 16.0 version, to one decimal place as a significant figure.

In the composition for forming a quantum dot layer of the present invention, the compound (A) may comprise a compound having a water/octanol partition coefficient log P of 3.5 or more in an amount of 55 to 100% by weight, more preferably 60 to 95% by weight, even more preferably from 70 to 95% by weight relative to the total weight.

If the compound having a log P of 3.5 or more is included in an amount of 55% by weight or more, since the penetration of oxygen and moisture is effectively prevented, oxidation of the quantum dots can be prevented. On the other hand, if the compound is contained in an amount of less than 55% by weight, the oxidation of the quantum dots may occur due to the penetration of oxygen and moisture, and even if the W value is higher than 3.0, it may be difficult to secure the reliability of the quantum dot film.

The compound having the water/octanol partition coefficient log P of 3.5 or more may be, for example, at least one selected from the group consisting of isobornyl(meth)acrylate, tricyclodecane dimethanol di(meth)acrylate, cyclohexane dimethanol di(meth)acrylate, dicyclopentadienyl (meth)acrylate, dicyclopentenyloxyethyl(meth)acrylate, dicyclopentanyl(meth)acrylate, dihydrodicyclopentadienyl (meth)acrylate, o-phenyl phenol oxyethyl(meth)acrylate, 3,3,5 trimethylcyclohexyl methacrylate, and alkyl(meth) acrylate having 6 to 20 carbon atoms, etc.

In the composition for forming a quantum dot layer of the present invention, the compound (A) preferably contains an active energy ray-curable compound having at least 3 functionalities of ethylenically unsaturated double bonds in an amount of 5 to 45% by weight relative to the total weight.

If the active energy ray-curable compound having at least 3 functionalities of ethylenically unsaturated double bonds is contained in an amount less than 5% by weight, the oxidation of the quantum dots is likely to occur by the penetration of oxygen and moisture due to the reduction of the curing density. If the compound exceeds 45% by weight, it is not preferable because the content of the compound having a log P of 3.5 or more is reduced, and the shrinkage rate is increased, thereby reducing the adhesion force between the interfaces and causing curl of the film.

The active energy ray-curable compound having at least 3 functionalities of ethylenically unsaturated double bonds may be, for example, at least one selected from the group consisting of trimethylolpropane tri(meth)acrylate, trimethylolpropane ethylene oxide addition tri(meth)acrylate, trimethylolpropane propylene oxide addition tri(meth)acrylate, glycerin propylene oxide addition tri(meth)acrylate, tris(2-hydroxyethyl)isocyanurate tri(meth) acrylate, pentaerythritol tri(meth)acrylate, pentaerythritol tri(meth)acrylate, pentaerythritol tetra(meth)acrylate, pentaerythritol ethylene oxide addition tetra(meth)acrylate, ditrimethanol propane tetra(meth)acrylate, dipentaerythritol penta(meth)acrylate, dipentaerythritol hexa(meth)acrylate, urethane(meth)acrylate with 3 functionalities, urethane(meth) acrylate with 6 functionalities, urethane(meth)acrylate with 10 functionalities, and urethane methacrylate with 15 functionalities.

In the composition for forming a quantum dot layer of the present invention, the compound (A) may be a (meth) acrylate-based compound.

In addition, the compound (A) may be those that do not include a functional group having the hydrogen bonding properties. The functional group having the hydrogen bonding property may be, for example, a hydroxyl group, a carboxyl group, a urethane group, or the like. Since the functional group having the hydrogen bonding property is hydrophilic, it can degrade the performance of quantum dot particles susceptible to moisture. Even in view of the entire composition for forming a quantum dot layer of the present invention, it may be more preferable that the functional group having the hydrogen bonding property is not included.

The composition for forming a quantum dot layer may comprise 0.1 to 10 parts by weight of a photo-initiator (C), 0.1 to 5 parts by weight of quantum dot particles (D), and 0.5 to 15 parts by weight of scattering particles (E) based on 100 parts by weight of the sum of the compound (A) and the compound (B).

In the composition for forming the quantum dot layer of the present invention, the compound (B) preferably may have one ester functional group per one thiol functional group. The compound (B) having one ester functional group per one thiol functional group may be, for example, at least one selected from the group consisting of ethyleneglycoldimercaptoacetate, trimethylolpropanetrimercaptoacetate, pentaerythritoltetramercaptoacetate, dipentaerythritol hexamercaptoacetate, ethylene glycol di(3-mercaptopropionate), trimethylolpropane tri(3-mercaptopropionate), dipentaerythritol hexa(3-mercaptopropionate), ethoxylated trimethylolpropane tri(3-mercaptopropionate), tris[2-(3-mercaptopropionyloxy)ethyl]isocyanurate, polycaprolactone tetra (3-mercaptopropionate), pentaerythritol tetrakis(3-mercaptobutyrate), 1,4-bis(3-mercaptobutyryloxy)butane, 1,3,5-tris(3-mercaptobutyloxyethyl)-1,3,5-triazine-2,4,6 (1H,3H,5H)-trione, trimethylolpropanetris(3-mercaptobutyrate) and the like.

In the composition for forming the quantum dot layer of the present invention, the photo-initiator (C) may include at least one acylphosphine oxide-based photo-initiator and at least one photo-initiator other than the acylphosphine oxide-based photo-initiator.

The acylphosphine oxide-based photo-initiator may be selected from the group consisting of bis(2,4,6-trimethylbenzoyl)-phenylphosphine oxide, 2,4,6-tribenzoyldiphenylphosphine oxide, ethyl-2,4,6-triethylbenzoylphenylphosphonate and the like. In addition, the photo-initiator other than the acylphosphine oxide-based photo-initiator may be selected, for example, from the group consisting of α-hydroxyalkylphenone-based, α-aminoalkylphenone-based, benzoineether-based, α, α-dialkoxyacetophenone-based, phenylglyoxylate-based and the like.

The α-hydroxy alkylphenone-based, α-aminoalkylphenone-based, benzoineether-based, or α,α-dialkoxyacetophenone-based photo-initiator may be at least one selected from the group consisting of 1-hydroxycyclohexylphenylketone, 2-hydroxy-2-methyl-1-phenyl-1-propanone, 2-hydroxy-1-[4-(2-hydroxyethoxy), α,α-dimethoxy-α-phenylacetophenone, 2-benzyl-2-(dimethylamino)-1-[4-(4-morpholinyl) phenyl]-1-butanone, methylbenzoylformate, oxy-phenyl-acetic acid 2-[2 oxo-2phenyl-acetoxy-ethoxy]-ethyl ester, oxy-phenyl-acetic acid 2-[2-hydroxy-ethoxy]-ethyl ester mixture and the like.

In the composition for forming the quantum dot layer of the present invention, the quantum dot particles (D) may be, for example, those comprising a core layer and a shell layer located outside the core layer, wherein at least one of the core layer and the shell layer may be doped with at least one of aluminum, silicon, titanium, magnesium, and zinc, and the core layer may include a III-V compound.

The Group III-V compound in the core layer may comprises a binary compound selected from GaN, GaP, GaAs, GaSb, AlN, AlP, AlAs, AlSb, InN, InP, InAs, InSb, and a mixture thereof; a ternary compound selected from GaNP, GaNAs, GaNSb, GaPAs, GaPSb, AlNP, AlNAs, AlNSb, AlPAs AlPSb, InNP, InNAs, InNSb, InPAs, InPSb, and a mixture thereof; or a quaternary compound selected from GaAlNAs, GaAlNSb, GaAlPAs, GaAlPSb, GaInNP, GaIn- NAs, GaInNSb, GaInPAs, GaInPSb, GaAlNP, InAlNP, InAl-NAs, InAlNSb, InAlPAs, InAlPSID, and a mixture thereof.

The quantum dot particles (D) may comprise, for example, In and P in the core layer, and at least one selected from Zn, Se, and S in the shell layer, and further may comprise a nonpolar ligand having 5 to 30 carbon atoms.

In the composition for forming the quantum dot layer, the scattering particles (E) may be at least one selected from the group consisting of silica, alumina, silicon, alumina, titanium dioxide (TiO2), zirconia (ZrO2), barium sulfate, zinc oxide (ZnO), poly(methylmethacrylate) (PMMA), benzoguanamine-based polymer and the like. In addition, the average particle diameter of the scattering particles (E) may preferably be 10 to 100 nanometers.

When the refractive index after curing of the composition for forming the quantum dot layer is Y1, and the refractive index of the scattering particles (E) is Y2, a difference between Y1 and Y2 may be 0.1 to 0.3.

In addition, the present invention relates to a quantum dot film comprising: a first barrier layer; a second barrier layer; and a quantum dot layer positioned between the first barrier layer and the second barrier layer, wherein the quantum dot layer is formed by the composition for forming the quantum dot layer of the present invention.

In addition, the present invention relates to a backlight unit comprising the quantum dot film and a liquid crystal display device including the backlight unit.

In the quantum dot film, backlight unit and liquid crystal display, techniques known in the art can be used without limitation, for other configurations except for the configurations including the quantum dot layer formed by the composition for forming the quantum dot layer, and the quantum dot film including the same.

Hereinafter, preferred examples are provided to aid the understanding of the present invention, but the following examples are merely illustrative of the present invention, and it will be apparent to those skilled in the art that various changes and modifications can be made within the scope and spirit of the present invention, and it goes without saying that changes and modifications belong to the appended claims.

Preparation Example 1: Preparation of Quantum Dot Particles 0.2 mmol of indium acetate, 0.6 mmol of palmitic acid and 10 mL of 1-octadecene were placed in a reactor and heated to 120° C. under vacuum. After several hours, the atmosphere in the reactor was switched to nitrogen. After heating to 280° C., a mixture solution of 0.1 mmol of tris (trimethylsilyl) phosphine and 0.5 mL of trioctylphosphine was rapidly injected and reacted for 20 minutes. Into the reaction solution cooled quickly to room temperature, acetone was added and the precipitate obtained by centrifugation was dispersed in toluene. The nanocrystals of the obtained InP semiconductor have a particle size determined depending on the reaction time, and show a UV maximum wavelength of 420 to 600 nm depending on the size of the particles. 0.3 mmol of zinc acetate (0.056 g), 0.6 mmol of oleic acid (0.189 g), and 10 mL of trioctylamine were added to a reaction flask and vacuum-treated at 120° C. for 10 minutes. After replacing the inside of the reaction flask with $N_2$, the temperature was raised to 220° C. Toluene dispersion (OD: 0.15) of the nanocrystals of InP semiconductor prepared above and 0.6 mmol of TOPS (sulfur dispersed/dissolved in trioctylphosphine) were added to the reaction flask and heated to 280° C. and allowed to react for 30 minutes. After the reaction was completed, the reaction solution was rapidly cooled to room temperature to obtain a reaction product comprising InP/ZnS quantum dots. Excess ethanol was added to the reaction product including the InP/ZnS quantum dots and centrifuged to remove excess organic matter present in the quantum dots. After centrifugation, the supernatant was discarded, and the centrifuged precipitate was dried and then dispersed in toluene to measure UV-vis absorption spectra, thereby having confirmed red light emitting or green light emitting. By the method described above, a dispersion of quantum dot particles exhibiting either red light emitting or green light emitting was prepared.

Preparation Example 2: Active Energy Ray-Curable Compound Having Ethylenically Unsaturated Double Bond Manufacture Example 2-1

40 parts by weight of trimethylolpropane triacrylate (M300 from Miwon Specialty Chemical company, log P=3.4, molecular weight of 296, 3 functional groups) of Formula 1 below and 60 parts by weight of isobornyl acrylate (AgiSyn 2870 from AGI company, log P=4.7, molecular weight of 206, 1 functional group) of Formula 2 below were mixed. At this time, the equivalent weight of ethylenically unsaturated double bond calculated by Math formula 2 was 163.1, and the W value calculated by Math formula 1 was 4.18.

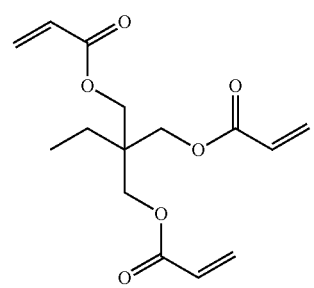

[Formula 1]

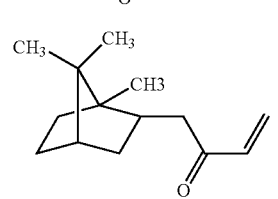

[Formula 2]

Preparation Example 2-2

10 parts by weight of pentaerythritol tri/tetraacrylate (M340 from Miwon Specialty Chemical company, 5:5 mixture of 3 and 4 functionalities, log P=2.9, molecular weight of 325, 3.5 functional groups) of Formula 3 below and 90 parts by weight of cyclohexane dimethanol diacrylate (CD401 from Akema company, log P=3.5, molecular weight of 252, 2 functional groups) of Formula 4 below were mixed. At this time, the equivalent weight of ethylenically unsaturated double bond calculated by Math formula 2 was 122.7, and the W value calculated by Math formula 1 was 3.44.

[Formula 3]

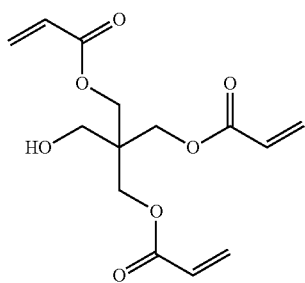

[Formula 4]

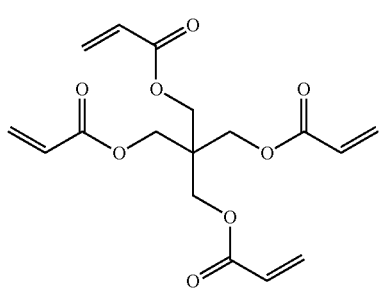

Preparation Example 2-3

10 parts by weight of trimethylolpropane triacrylate (M300 from Miwon Specialty Chemical company, log P=3.4, molecular weight of 296, 3 functional groups) of Formula 1 below and 90 parts by weight of tricyclodecane dimethanol diacrylate (SR833S from Akema company, log P=4.7, molecular weight of 304, 2 functional groups) of Formula 5 below were mixed. At this time, the equivalent weight of ethylenically unsaturated double bond calculated by Math formula 2 was 146.7, and the W value calculated by Math formula 1 was 4.57.

[Formula 1]

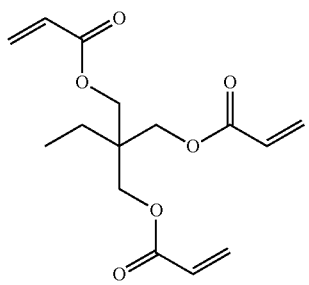

[Formula 5]

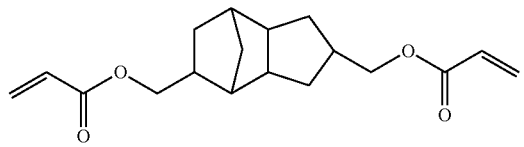

Preparation Example 2-4

60 parts by weight of glycerin propylene oxide addition (3 mol) triacrylate (M4004 from Miwon Specialty Chemical company, log P=2.6, molecular weight of 428, 3 functional groups) of Formula 6 below and 40 parts by weight of cyclohexane dimethanol diacrylate (CD401 from Akema company, log P=3.5, molecular weight of 252, 2 functional groups) of Formula 4 below were mixed. At this time, the equivalent weight of ethylenically unsaturated double bond calculated by Math formula 2 was 136.0, and the W value calculated by Math formula 1 was 2.96.

[Formula 4]

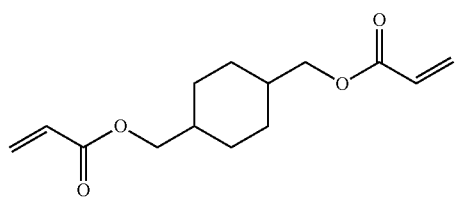

[Formula 6]

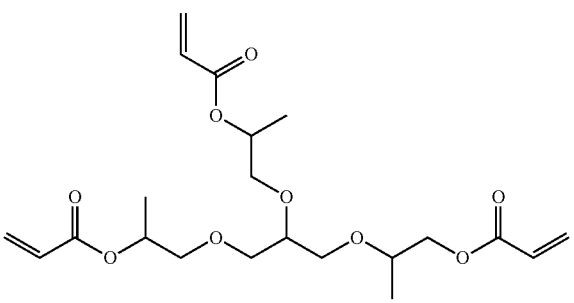

Preparation Example 2-5

30 parts by weight of trimethylolpropane triacrylate (M300 from Miwon Specialty Chemical company, log P=3.4, molecular weight of 296, 3 functional groups) of Formula 1 below and 70 parts by weight of polyethylene glycol (9 mol) diacrylate (M280 from Miwon Specialty Chemical company, log P=0.2, molecular weight of 523, 2 functional groups) of Formula 7 below were mixed. At this time, the equivalent weight of ethylenically unsaturated double bond calculated by Math formula 2 was 212.7, and the W value calculated by Math formula 1 was 1.16.

[Formula 1]

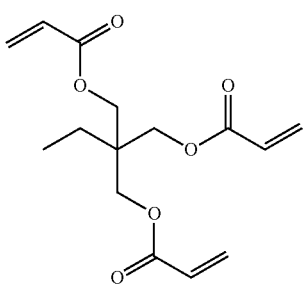

[Formula 7]

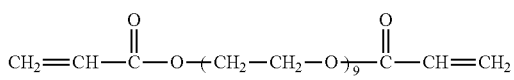

Preparation Example 2-6

50 parts by weight of butanediol diacrylate (M204 from Miwon Specialty Chemical company, log P=2.0, molecular weight of 198, 2 functional groups) of Formula 8 below and 50 parts by weight of isobornyl acrylate (AgiSyn2870 from AGI company, log P=4.7, molecular weight of 206, 1 functional group) of Formula 2 below were mixed. At this time, the equivalent weight of ethylenically unsaturated double bond calculated by Math formula 2 was 152.5, and the W value calculated by Math formula 1 was 3.35.

[Formula 2]

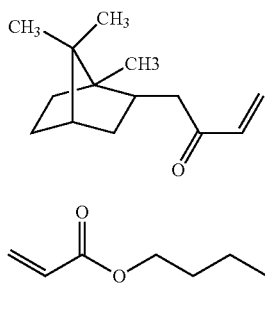

[Formula 8]

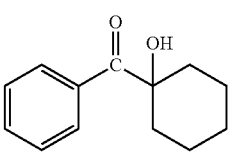

Preparation Example 3: Preparation of Quantum Dot Resin

The matrix resins of the quantum dot particles of Examples 1 to 8 and Comparative Examples 1 to 8 were prepared using the active energy ray-curable compound having ethylenically unsaturated double bond of Preparation Example 2 and pentaerythritol tetramercaptoacetate (PEMP from SC Organic Chemical company, molecular weight of 488, 4 functional groups) of Formula 9 below or pentaerythritol tetrakis(3-mercaptobutyrate) (PE1 from Showa Denko company, molecular weight of 545, 4 functional groups) of Formula 10 below in the ratios shown in Tables 1 and 2, respectively.

0.3 part by weight of red light emitting particles and 0.7 part by weight of blue light emitting particles among the quantum dot particles of Preparation Example 1, 5 parts by weight of zinc oxide (FINEX 30 from Sakai Chemical company, average particle diameter of 35 nm) as a scattering agent, 2 parts by weight of 1-hydroxy-cyclohexyl-phenyl-ketone (Irgacure 184 from IGM company) of Formula 11 below as a photo-initiator, and 2 parts by weight of 2,4,6-tribenzoyldiphenylphosphine oxide (Darocure TPO from IGM company) of Formula 12, relative to all compositions of 100 parts by weight of the matrix resin of the quantum dot particles, were uniformly mixed at a speed of 500 rpm through a high speed stirrer to prepare a quantum dot resin.

[Formula 9]

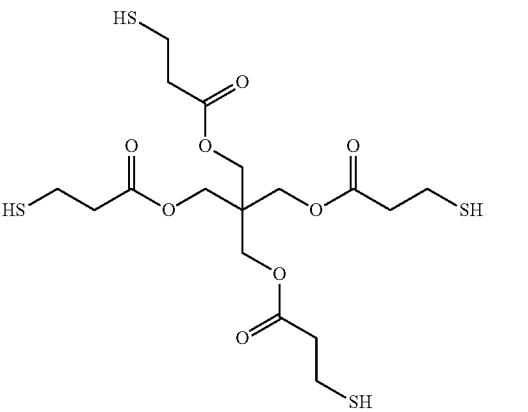

[Formula 10]

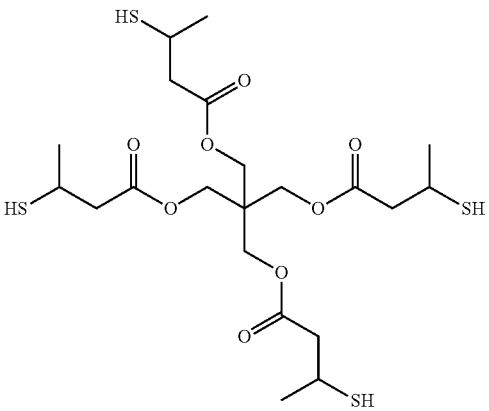

[Formula 11]

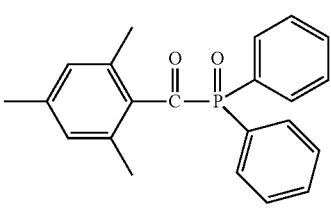

[Formula 12]

TABLE 1

|  | Example 1 | Example 2 | Example 3 | Example 4 | Example 5 | Example 6 | Example 7 | Example 8 |
|---|---|---|---|---|---|---|---|---|
| Active energy ray-curable compound (A) having ethylenically unsaturated double bond | Preparation Example 2-1, 60 parts by weight | Preparation Example 2-2, 60 parts by weight | Preparation Example 2-3, 52 parts by weight | Preparation Example 2-1, 70 parts by weight | Preparation Example2-1, 60 parts by weight | Preparation Example 2-2, 80 parts by weight | Preparation Example 2-3, 60 parts by weight | Preparation Example 2-2, 70 parts by weight |
| Thiol compound (B) having two or more mercapto groups in the molecule | Formula 9, 40 parts by weight | Formula 9, 40 parts by weight | Formula 9, 48 parts by weight | Formula 9, 30 parts by weight | Formula 10, 40 parts by weight | Formula 10, 20 parts by weight | Formula 10, 40 parts by weight | Formula 9, 30 parts by weight |
| Equivalent ratio (Equivalent weight (B)/Equivalent weight (A)) | 0.50 | 0.66 | 0.77 | 0.32 | 0.56 | 0.28 | 0.62 | 0.43 |
| Water/octanol partition coefficient(W) of mixture (A) | 4.18 | 3.44 | 4.57 | 4.18 | 4.18 | 3.44 | 4.57 | 3.44 |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Active energy ray-curable compound (A) having ethylenically unsaturated double bond | Preparation Example 2-4, 50 parts by weight | Preparation Example 2-5, 50 parts by weight | Preparation Example 2-1, 100 parts by weight | Preparation Example 2-2, 50 parts by weight | Preparation Example 2-3, 85 parts by weight | Preparation Example 2-3, 45 parts by weight | Preparation Example 2-2, 90 parts by weight |
| Thiol compound (B) having two or more mercapto groups in the molecule | Formula 9, 50 parts by weight | Formula 9, 50 parts by weight | — | Formula 9, 50 parts by weight | Formula 10, 15 parts by weight | Formula 9, 55 parts by weight | Formula 9, 10 parts by weight |
| Equivalent ratio (Equivalent weight (B)/Equivalent weight (A)) | 0.90 | 0.57 | — | 0.99 | 0.16 | 1.02 | 0.11 |
| Water/octanol partition coefficient(W) of mixture (A) | 2.96 | 1.16 | 4.18 | 3.44 | 4.57 | 4.57 | 3.44 |

Preparation Example 4: Preparation of Quantum Dot Film

Polyethylene terephthalate film (A4300 from Toyobo company) having a thickness of 50 μm was used as the first barrier film and the second barrier film. The quantum dot resins prepared with Examples 1 to 8 and Comparative Examples 1 to 7 in Preparation Example 3 were filtered through a 0.2 μm Teflon filter, and then depressurized for 30 minutes to completely remove bubbles in the quantum dot resin. The quantum dot resin was coated on the first barrier film using a micro bar, and the second barrier film was laminated thereon using a rubber roll so as not to generate bubbles, and then UV curing was performed. At this time, a UV curing device (UVMH1001) from Litzen company equipped with a metal halide lamp was used as an ultraviolet curing device, and the amount of light in the UVA region measured by using UV Puck II from EIT company was 1500 mJ. The thickness of the cured Quantum dot resin was maintained at 50±2 μm.

Experimental Example: Evaluation of Physical Properties of Quantum Dot Film

The physical properties of the quantum dot film prepared above were evaluated, and the results are shown in Tables 3 and 4 below.

1) $O_2$ Permeability(cc/m/day/atm)

Measurements were performed using a Mocon OX-TRAN Model 2/21 device (Mocon, Inc., Minneapolis, Minn.). The measurements were performed in the manner described in ASTM method D3985 (Standard test method for oxygen gas permeability through sheeting and plastic film using the Jan. 30, 1981 Coulometric Sensor) using test gases of 3% $O_2$ and 97% $N_2$ at 23° C.

2) Moisture Permeability Measurement

The moisture permeability of the quantum dot film was measured using a moisture permeability meter (MOCON, AQUATRAN MODEL 2).

3) Measurement of Luminance

After cutting the quantum dot film to A4 size and then mounting it in the center of the backlight of Samsung SUHD TV JS6500 model and applying the power source, the luminances (Y) at 13 points were measured using a luminance meter (CS-2000, Minolta Co., Ltd.) to obtain an average value.

The luminance (Y) after standing at heat resistance (80° C.) and high temperature and high humidity (90° C., 60%) for 250 hours compared to the initial luminance was measured, and then, based on this, the rate of change (Y (%)) compared to the initial luminance was measured.

4) Edge Discoloration

After cutting the quantum dot film to A4 size and standing the film at 85° C. and 85% humidity for 48 hours, and then mounting it in the center of the backlight of Samsung SUHD TV JS6500 model and applying the power source, the presence or absence of discoloration phenomenon at each corner was visually confirmed. If there is no discoloration, it was indicated by ⊚, if there is a slight discoloration, it was indicated by ○, if there is a certain discoloration of two or more of four surfaces, it was indicated by Δ, and if there is a certain discoloration of more than three of the four sides, it was indicated by X.

TABLE 3

|  | Example 1 | Example 2 | Example 3 | Example 4 | Example 5 | Example 6 | Example 7 | Example 8 |
|---|---|---|---|---|---|---|---|---|
| Oxygen permeability (cc/m/day/atm) | 0.022 ± 0.002 | 0.021 ± 0.002 | 0.020 ± 0.002 | 0.024 ± 0.002 | 0.021 ± 0.002 | 0.024 ± 0.002 | 0.020 ± 0.002 | 0.023 ± 0.002 |
| Moisture permeability (g/m² · day) | 1.5 | <0.8 | <0.8 | 3.2 | 0.9 | 3.7 | <0.8 | 2.7 |
| Initial luminance, Y(cd/m²) | 592.9 | 590.4 | 593.1 | 590.3 | 590.1 | 589.9 | 592.1 | 590.7 |
| High temperature luminance (Y(%)) | 590.1 (99.5) | 587.3 (99.5) | 590.1 (99.5) | 588.7 (99.7) | 587.9 (99.6) | 587.1 (99.5) | 587.5 (99.2) | 588.3 (99.6) |
| High temperature and high humidity luminance (Y(%)) | 527.4 (89.0) | 520.9 (88.2) | 522.7 (88.1) | 518.6 (87.9) | 519.9 (88.1) | 528.6 (89.6) | 529.4 (89.4) | 520.4 (88.1) |
| Edge discoloration | ⊚ | ⊚ | ⊚ | ○ | ⊚ | ○ | ⊚ | ○ |

TABLE 4

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Oxygen permeability (cc/m/day/atm) | 0.030 ± 0.003 | 0.031 ± 0.003 | 0.042 ± 0.004 | 0.029 ± 0.003 | 0.039 ± 0.004 | 0.029 ± 0.003 | 0.043 ± 0.004 |
| Moisture permeability (g/m² · day) | 6.5 | 5.9 | >10 | 4.6 | >10 | 4.4 | >10 |
| Initial luminance, Y (cd/m²) | 588.6 | 589.4 | 593.1 | 590.6 | 591.2 | 590.5 | 592.4 |
| High temperature luminance (Y(%)) | 501.6 (85.2) | 499.8 (84.8) | 440.1 (74.2) | 489.1 (82.8) | 450.3 (76.2) | 510.4 (86.4) | 470.6 (79.4) |
| High temperature and high humidity luminance (Y(%)) | 412.3 (70.0) | 409.4 (69.5) | 374.4 (63.1) | 411.3 (69.6) | 391.3 (66.2) | 417.3 (70.7) | 392.5 (66.3) |
| Edge discoloration | Δ | Δ | X | Δ | X | Δ | X |

As shown in Table 3 and Table 4 above, it was confirmed that the quantum dot film prepared using the composition for forming a quantum dot layer of the present invention has excellent oxygen permeability and moisture permeability, outstandingly excellent luminance in high temperature environment, or high temperature and high humidity environment, and also excellent edge discoloration characteristics.

What is claimed is:

1. A composition for forming a quantum dot layer comprising:
   (A) at least one active energy ray-curable compound having an ethylenically unsaturated double bond,
   (B) at least one thiol compound having at least two mercapto groups in one molecule,
   (C) a photo-initiator,
   (D) quantum dot particles, and
   (E) scattering particles,
   wherein the composition contains 0.28 to 0.77 equivalents of the at least one thiol compound (B) per one equivalent of the at least one active energy ray-curable compound (A),
   wherein a W value of the at least one active energy ray-curable compound (A) calculated by Math formula 1 is 3.44 to 4.57,
   wherein the at least one active energy ray-curable compound (A) contains 10 to 40% by weight of an active energy ray-curable compound having at least 3 functionalities of ethylenically unsaturated double bonds relative to a total weight of the at least one active energy ray-curable compound (A):

Math formula 1

$$W = \Sigma_1^n (\log P_n \times WF_n)$$

wherein, $\log P_n$: water/octanol partition coefficient of n substance, and $WF_n$: weight fraction of n substance, $\Sigma_1^n WF_n = 1$; and wherein the at least one active energy ray-curable compound (A) contains 60 to 100% by weight of a compound having a water/octanol partition coefficient log P of 3.5 or more.

2. The composition for forming the quantum dot layer according to claim 1, wherein the at least one active energy ray-curable compound (A) is a (meth) acrylate-based compound.

3. The composition for forming the quantum dot layer according to claim 1, wherein the at least one active energy ray-curable compound (A) does not contain a functional group having hydrogen bonding property.

4. The composition for forming the quantum dot layer according to claim 1, wherein the composition for forming a quantum dot layer may comprise 0.1 to 10 parts by weight of the photo-initiator (C), 0.1 to 5 parts by weight of the quantum dot particles (D), and 0.5 to 15 parts by weight of the scattering particles (E) based on 100 parts by weight of the sum of the at least one active energy ray-curable compound (A) and the at least one thiol compound (B).

5. The composition for forming the quantum dot layer according to claim 1, wherein the at least one thiol compound (B) has one ester functional group per one thiol functional group.

6. The composition for forming the quantum dot layer according to claim 1, wherein the photo-initiator (C) comprises at least one acylphosphine oxide-based photo-initiator and at least one photo-initiator other than the acylphosphine oxide-based photo-initiator.

7. The composition for forming the quantum dot layer according to claim 1, wherein the quantum dot particles (D) comprises a core layer and a shell layer located outside the core layer, at least one of the core layer or the shell layer is doped with at least one selected from the group consisting of aluminum, silicon, titanium, magnesium, and zinc, and the core layer contains a Group III-V compound.

8. The composition for forming the quantum dot layer according to claim 1, wherein the scattering particles (E) are at least one selected from the group consisting of silica, alumina, silicon, titanium dioxide (TiO2), zirconia(ZrO2), barium sulfate, zinc oxide (ZnO), poly(methylmethacrylate), and benzoguanamine-based polymer, and have an average particle diameter of 10 to 100 nanometers.

9. The composition for forming the quantum dot layer according to claim 1, wherein the compound having the water/octanol partition coefficient log P of 3.5 or more, which is contained in the at least one active energy ray-curable compound (A), is at least one selected from the group consisting of isobornyl(meth)acrylate, tricyclodecane dimethanol di(meth)acrylate, cyclohexane dimethanol di(meth)acrylate, dicyclopentadienyl(meth)acrylate, dicyclopentenyloxyethyl(meth)acrylate, dicyclopentanyl(meth) acrylate, dihydrodicyclopentadienyl(meth)acrylate, o-phenyl phenol oxyethyl(meth)acrylate, 3,3,5 trimethylcyclohexyl methacrylate, and alkyl(meth)acrylate having 6 to 20 carbon atoms.

10. The composition for forming the quantum dot layer according to claim 1, wherein the active energy ray-curable compound having at least 3 functionalities of ethylenically unsaturated double bonds is at least one selected from the group consisting of trimethylolpropane tri(meth)acrylate, trimethylolpropane ethylene oxide addition tri(meth)acrylate, trimethylolpropane propylene oxide addition tri(meth)acrylate, glycerin propylene oxide addition tri(meth)acrylate, tris(2-hydroxyethyl)isocyanurate tri(meth) acrylate, pentaerythritol tri(meth)acrylate, pentaerythritol tetra(meth) acrylate, pentaerythritol ethylene oxide addition tetra(meth) acrylate, ditrimethanol propane tetra(meth)acrylate, dipentaerythritol penta(meth)acrylate, dipentaerythritol hexa (meth)acrylate, urethane(meth)acrylate with 3 functionalities, urethane(meth) acrylate with 6 functionalities, urethane(meth)acrylate with 10 functionalities, and urethane methacrylate with 15 functionalities.

11. The composition for forming the quantum dot layer according to claim 5, wherein the at least one thiol compound (B) having one ester functional group per one thiol functional group is at least one selected from the group consisting of ethyleneglycoldimercaptoacetate, trimethylolpropanetrimercaptoacetate, pentaerythritoltetramercaptoacetate, dipentaerythritol hexamercaptoacetate, ethylene glycol di(3-mercaptopropionate), trimethylolpropane tri(3-mercaptopropionate), dipentaerythritol hexa(3-mercaptopropionate), ethoxylated trimethylolpropane tri(3-mercaptopropionate), tris[2-(3-mercaptopropionyloxy) ethyl]isocyanurate, polycaprolactone tetra(3-mercaptopropionate), pentaerythritol tetrakis(3-mercaptobutyrate), 1,4-bis(3-mercaptobutyryloxy)butane, 1,3,5-tris(3-mercaptobutyloxyethyl)-1,3,5-triazine-2,4,6 (1H,3H,5H)-trione, and trimethylolpropanetris(3-mercaptobutyrate).

12. A quantum dot film comprising a first barrier layer; a second barrier layer; and a quantum dot layer positioned between the first barrier layer and the second barrier layer, wherein the quantum dot layer is formed with the composition for forming the quantum dot layer according to claim 1.

13. A backlight unit comprising the quantum dot film of claim 12.

14. A liquid crystal display comprising the backlight unit of claim 13.

* * * * *